Jan. 4, 1966   R. W. G. HUNT ETAL   3,227,044
METHOD OF CONTROLLING THE SPECTRAL COMPOSITION OF
A LIGHT SOURCE BY THE UTILIZATION OF COLOR
CONTROL AND CORRECTING LIGHT FILTERS
Filed Sept. 23, 1960   3 Sheets-Sheet 1

EDWARD K. LETZER
ROBERT W. G. HUNT
INVENTORS

BY
ATTORNEYS

EDWARD K. LETZER
ROBERT W. G. HUNT
INVENTORS

ATTORNEYS

Jan. 4, 1966  R. W. G. HUNT ETAL  3,227,044
METHOD OF CONTROLLING THE SPECTRAL COMPOSITION OF
A LIGHT SOURCE BY THE UTILIZATION OF COLOR
CONTROL AND CORRECTING LIGHT FILTERS
Filed Sept. 23, 1960
3 Sheets-Sheet 3

EDWARD K. LETZER
ROBERT W. G. HUNT
INVENTORS

BY

ATTORNEYS

United States Patent Office 3,227,044
Patented Jan. 4, 1966

3,227,044
METHOD OF CONTROLLING THE SPECTRAL COMPOSITION OF A LIGHT SOURCE BY THE UTILIZATION OF COLOR CONTROL AND CORRECTING LIGHT FILTERS
Robert William Gainer Hunt, Wealdstone, England, and Edward K. Letzer, Rochester, N.Y., assignors to Eastman Kodak Company, Rochester, N.Y., a corporation of New Jersey
Filed Sept. 23, 1960, Ser. No. 58,135
7 Claims. (Cl. 88—112)

The present invention relates to the control of illuminants for use in color measurement and color reproduction.

In apparatus used for color measurement and color reproduction, particularly photographic enlargers or projection printers which are to be used for printing either negative or positive color transparencies, it is often necessary to provide means for adjusting the relative intensities of the light in the various regions of the spectrum.

Various methods have been used to vary the spectral composition of a light source for the purpose described above but those most generally preferred consist of a light beam that is intercepted with filters which have different absorptions in different regions of the spectrum. Such a method suffers from the disadvantage that a number of calibrated filters have to be obtained and stored and their stability and accuracy of calibration is often not very great which results in great difficulties when a fine and consistent control of the color of the light beam is required. To overcome these difficulties methods of using filters of variable absorption in a light source in conjunction with some means for gauging their effect such as by measuring the spectral composition of the filtered light beam have been developed. Such a light source may be constructed in which the color of the issuing light is varied by a color filter which greatly absorbs one region of the spectrum and which is variably inserted into a light beam. In many cases due to the imperfections of the absorption characteristics of the said color filter, the intensities of the issuing light in the other regions of the spectrum will be altered. One method of obviating this effect has been described in U.S. patent application 785,640 dated January 8, 1959 by R. W. G. Hunt, now Patent 3,089,386, May 14, 1963. In the method disclosed in the said application a color filter with a low transmission in one region of the spectrum partially or completely covers the entrance to a light scrambling device, such as a mirror box together with a sheet of opal glass, onto which is shone a beam of light. The uncovered area of the said entrance is covered by a correcting filter which has substantially the same transmission as the color filter in the regions of the spectrum in which the color filter has its greater transmission. The said correcting filter counteracts the tendency of the unwanted absorptions of the said color filter in the said regions of the spectrum to vary the intensities of the said regions in the issuing light as the said color filter is inserted into the beam of light.

There color filters, each of which has a region of low transmission in one region of the spectrum which differs from those of the other two filters can be so placed that a beam of light passes through each filter, or part of each filter, successively before entering a light scrambling device, such as that described in the previous paragraph. If the said three color filters consist of pairs of filters according to the patent application described in the previous paragraph it is possible by the movement of any one pair of filters to alter the ratio of the intensity of the light in the region of lower transmission of the color filter of the pair being moved to the intensity of the light in the other two regions without altering the ratio of the intensities of the light in the other two regions to each other. It is obvious that it will often be desirable to adjust the filters so that the intensity of the light in two regions of the spectrum may be lowered simultaneously. To reduce the number of separate controls involved in making such an adjustment, a color filter may be used which has a low transmission in two regions of the spectrum. If such a filter is adjusted so as to vary the spectral composition of a light source in a manner as described above, although a compensating filter may be chosen which will keep the intensity of light in the region of the spectrum of greater transmission constant, the ratio of the intensities in the two regions of lesser transmission will usually vary as the said color filter is adjusted and especially so in the presence of other color filters inserted partially into the light beam.

It is an object of the present invention to counteract this variation in the ratio of the intensities in the two regions of lesser transmission. It is a further object of the present invention to control the spectral composition of a light source by means of color filters in such a manner that the intensity of the light in one region of the spectrum may be controlled without altering the ratio of the intensities of the light in other regions of the spectrum. These and other objects are now described.

For the purpose of describing the various embodiments of the present invention the spectrum will be considered to be split up into three regions which will be referred to as red, green and blue although these regions may extend into or be entirely included in the infrared and ultraviolet parts of the spectrum in practice, and the method of the invention may be applied to a spectrum which is split up into more than three regions.

In accordance with one embodiment of the present invention there is provided a method of varying the spectral composition of a beam of light containing light in three regions of the spectrum comprising adjustably inserting a color filter into said beam which has a greater transmission in one region of the spectrum and a lesser transmission in the other two regions of the spectrum and keeping substantially constant the ratio of the transmissions of the light in said two regions of lesser transmission as said color filter is inserted into said beam of light by varying amounts, including fully in and completely out of said beam of light, to counteract the tendency of the unwanted differences in transmission of the color filter in said two regions of lesser transmission to vary the ratio of the intensities of those said two regions of lesser transmission in the beam of light.

In order that the present invention may be clearly understood, several forms thereof will now be described, by way of example, with reference to the accompanying drawings, in which.

Figure 1:
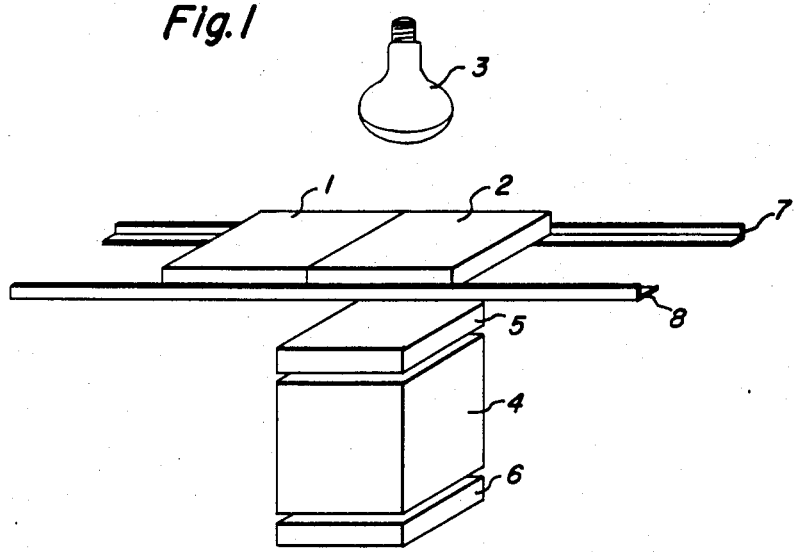
FIG. 1 shows diagrammatically a filter-pair for carrying into effect the method of controlling a light source in accordance with one form of the invention.

As shown in FIG. 1 a color control filter 1, hereinafter referred to as a color filter, is cemented to a correcting filter 2, or the two filters may be mounted side by side in a frame or the two filters may be fixed or coated side by side on a single piece of glass, or otherwise mounted side by side. Light from a light source 3, which may be an incandescent lamp with integral reflector, passes through one or part of both of the filters 1 and 2 and into a light scrambling device consisting of a mirror box 4 formed by four mirrors, the ends of the box being closed by two diffusers 5 and 6 comprising opalized sheet material. The mirror box may be replaced by any known light scrambling device, such as a block of any transparent material, such as glass or clear plastic material, having polished walls, or the filter combination 1 and 2 may be so positioned in an optical system of lenses and/or mirrors that it is completely out of focus with respect to the final image. The color filter 1 has a greater transmission in one region of the spectrum and lesser transmissions in the other two regions of the spectrum. In the regions where the color filter 1 has the lesser transmission the correcting filter 2 has greater transmissions which are however in substantially the same ratio as those of the color filter. This will be seen clearly from the following table:

| | Color Filter | | Correcting Filter |
|---|---|---|---|
| Name | Greater transmission | Lesser transmission | Ratio of transmissions which are the same as the ratio of lesser transmissions of the color filter |
| Red | Red | Blue and Green | Blue to Green. |
| Green | Green | Blue and red | Blue to Red. |
| Blue | Blue | Green and red | Green to Red. |

The two filters 1 and 2 are mounted for movement, for instance on runners 7 and 8, as a unit across the path of the light beam from the light source so that as one filter is introduced into the light beam, the other filter is withdrawn. Assuming that the color filter 1 is green and fully withdrawn from the light beam, the correcting filter 2 will have the same ratio of blue to red transmissions as the green filter and will be disposed fully in the light beam. As the green filter is introduced into the light beam, the correcting filter will be progressively withdrawn from the light beam so that in all positions of the filters the light beam will be exactly covered by one or the other of the filters or by a part of both. Because the correcting filter has the same ratio of blue to red transmission as the green filter, adjustment of the position of the filter-pair in the beam makes no difference to the ratio of the blue to red intensities in the issuing light. The filter-pair thus provides a means for adjusting the green to blue and green to red ratio of the beam independently of the blue to red ratio, and hence the effects of the differences in blue and red transmissions of the green dye or glass are counteracted. Similarly, if the color filter 1 is blue or red, and the correcting filter is as shown in the above table, the filter-pair provides a means for adjusting the ratio of the blue to green and blue to red contents of the beam independently of the green to red ratio, or the ratio of the red to blue and red to green contents of the beam independently of the blue to green ratio, respectively. Hence, the effects of the differences in green and red transmissions of the blue dye or glass or the differences in blue and green transmissions of the red dye or glass are counteracted.

Figure 2:
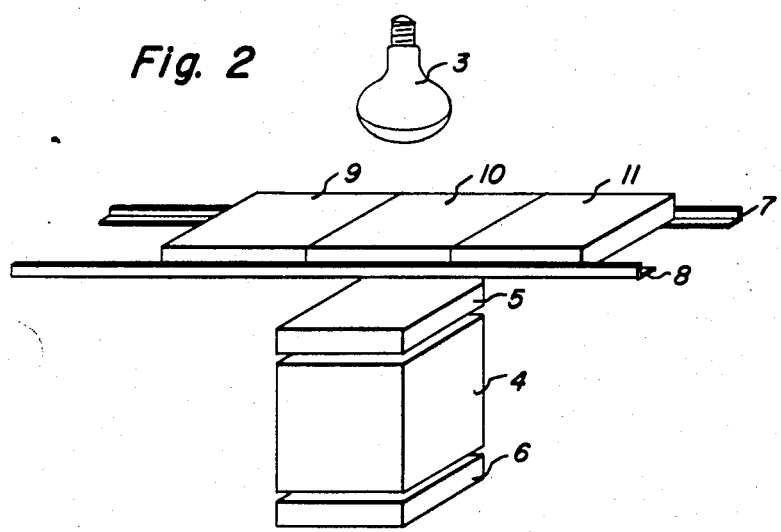
FIG. 2 shows diagrammatically a triple filter for carrying into effect the method according to a modified form of the invention.

In FIG. 2 the same parts have the same reference numerals as in FIG. 1. According to this embodiment there are employed two color control filters 9 and 11 mounted each side of a correcting filter 10 by any of the methods previously described. The light source and scrambling arrangements are as described previously.

The color control filter 9 has a greater transmission in one region of the spectrum and lesser transmissions in the other two regions of the spectrum. The color control filter 11 has greater transmissions in two regions of the spectrum and a lesser transmission in one region of the spectrum, the said region of lesser transmission being the same as the region of greater transmission of filter 9. In the regions where the color control filter 9 has the lesser transmissions the correcting filter 10 has greater transmissions which are however in substantially the same ratio as those of the color filter 9. The correcting filter 10 has a transmission which is substantially the same as the color filter 11 in its regions of greater transmission. The correcting filter 10 thus serves both filter 9 and filter 11, and it is therefore necessary for filters 9 and 11 to have the same ratio of transmissions in the regions where the filter 9 has the lesser transmissions. This is realized by choosing dyes or glasses or mixtures of dyes or glasses for the filters 9 and 11 appropriately. This will be seen clearly from the following table:

| Color Control Filter 9 | | Correcting Filter | | Color Control Filter 11 | |
|---|---|---|---|---|---|
| Color | Lesser transmissions | Ratio of transmissions which are the same as colored filter 9 | Transmissions which are the same as colored filter 11 | Color | Greater transmission |
| Red | Blue and Green | Blue to Green | Blue and Green | Cyan | Blue and Green. |
| Green | Blue and Red | Blue to Red | Blue and Red | Magenta | Blue and Red. |
| Blue | Green and Red | Green to Red | Green and Red | Yellow | Green and Red. |

The three filters 9, 10 and 11 are mounted for movement, for instance on runners 7 and 8, as a unit across the path of the light beam from the light source so that as one filter is introduced into the light beam another filter is withdrawn. Assuming that the color control filter 9 is green and fully withdrawn from the light beam, and that the color control filter 11 is magenta and is also fully withdrawn from the light beam, the correcting filter 10 will have the same ratio of blue to red transmissions as the green filter and will have the same value blue and red transmissions as the magenta filter and will be disposed fully in the light beam. As the green filter 9 is introduced into the light beam, the correcting filter 10 will be progressively withdrawn from the light beam so that in all positions of the filters the light beam will be intercepted by one or the other of the filters or by a part of both 9 and 10. Similarly as the magenta filter 11 is introduced into the light beam, the correcting filter 10 will be progressively withdrawn from the light beam so that in all positions of the filters the light beam will be intercepted by one or the other of the filters or by a part of both 10 and 11. Thus, as shown in FIG. 2, it is never possible for the two color filters 9 and 11 to intercept the beam simultaneously.

If, however, filter 10 is much narrower than the aperture of the light scrambling device, filters 9 and 11 could intercept the beam simultaneously; this is a permissible alternative form of the invention and has the advantages that the rate of change of filtration with movement of the filters is less variable, and the overall intensity of the light remains more nearly constant.

Because the correcting filter has the same ratio of blue to red transmission as the green filter, adjustment of the position of the filters so that the green filter enters the beam does not alter the ratio of the blue to red intensities in the issuing beam.

These two filters 9 and 10 thus provide a means for adjusting the green to blue and green to red ratio of the beam independently of the blue to red ratio in the same manner as filters 1 and 2 of FIG. 1, previously described. Also, because the correcting filter 10 has the same red and blue absorptions as the magenta filter 11, adjustment of the position of the filters, so that the magenta filter enters the beam does not alter either the ratio of the blue to red intensities in the issuing beam or their individual intensities. The triple row of filters thus provide a means for adjusting the green to blue and green to red ratio of the beam independently of the blue to red ratio so that the aforesaid green to blue and green to red ratio may be either greater or less than the values when the correcting filter only is in the light beam, and the effects of both the differences in the blue and red transmissions of the green dye or glass and the unwanted absorptions in the blue and red of the magenta dye or glass are counteracted by means of a single correcting filter.

Similarly, if the color control filter 9 is blue or red, and the correcting filter 10 and color control filter 11 are as shown in the above table, the filter row provides a means for adjusting the ratio of the blue to green and blue to red contents of the beams independently of the green to red ratio so that it is either greater or less than the ratio with only the compensating filter in position, or the ratio of the red to blue and red to green contents of the beam independently of the blue to green ratio so that it is either greater or less than the ratio with only the compensating filter in position, respectively.

Hence, the effects of both the differences in green and red transmissions of the blue dye or glass and the unwanted green and red absorptions of the yellow dye or glass, or the effects of both the differences in blue and green transmissions of the red dye or glass and the unwanted absorptions of the cyan dye or glass, are counteracted.

Figure 3:
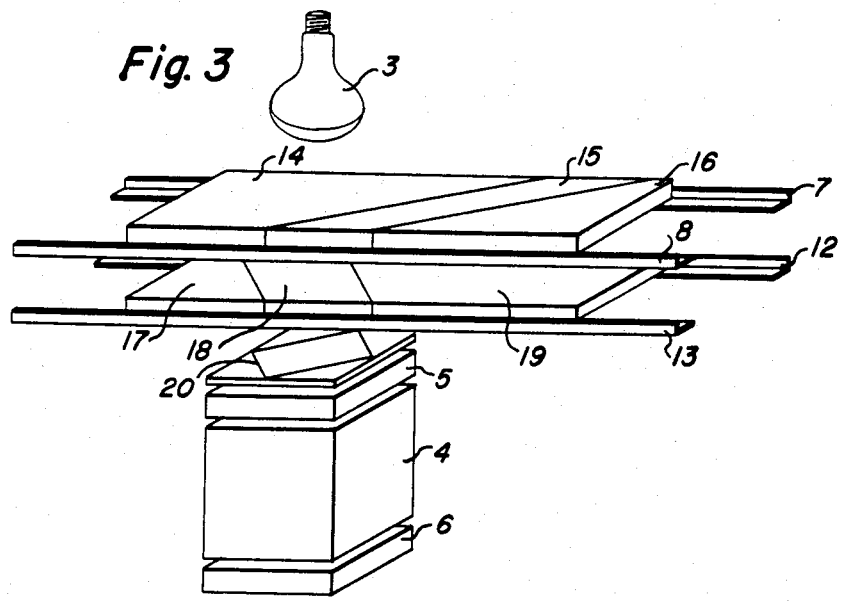
FIG. 3 shows diagrammatically two pairs of triple filters for carrying into effect the method according to another modified form of the invention.

In FIG. 3 the same parts have the same reference numerals as in FIG. 1. According to this embodiment there are employed two rows of filters each containing two color control filters 14, 16, 17 and 19 and a common correcting filter 15 and 18, the filters in one row, 17, 18, 19 being chosen and used according to the method described with reference to FIG. 2 for filters 9, 10 and 11. The color control filters 14 and 16 each have a lesser transmission in one region of the spectrum, the regions being respectively those in which color control filter 17 has its lesser transmissions. In the region where both filters 14 and 16 have their greater transmission, the correcting filter 15 is chosen to have substantially the same transmission as the color control filters 14 and 16, which will also be the region of greater transmission of color control filter 17 and the region of lesser transmission of color control filter 19 which are chosen according to the method described for filters 9 and 11 for FIG. 2.

The correcting filter 15 thus serves both filter 14 and filter 16, and it is therefore necessary for filters 14 and 16 to have the same transmission in the region where the filter 17 has its greater transmission. This is realized by choosing dyes or glasses or mixtures of dyes or glasses for the filters 14 and 15 appropriately.

This will be seen clearly from the following table in which three possible arrangements are described.

| Color Control Filter | | | | Correcting Filter—Function and usual color | Color Control Filter | | |
|---|---|---|---|---|---|---|---|
| Layer | Color | Function | Defects | | Color | Function | Defects |
| Upper | Cyan | Absorbs red. | Absorbs some green and blue. | Absorbs the same amount of green as cyan and yellow filters. Pink. | Yellow | Absorbs blue. | Absorbs a little green and red. Green absorption made the same as that of the cyan filter. |
| Lower | Magenta | Absorbs green. | Absorbs some blue and a little red. | Same red to blue transmission ratio as the green filter and same red and blue transmissions as magenta filter. Orange. | Green | Absorbs red and blue. | Red to blue transmission ratio made the same as that of the magenta filter. |
| Upper | Magenta | do | do | Absorbs the same amount of blue as magenta and cyan filters. Orange. | Cyan | Absorbs red. | Absorbs some green and blue. Blue absorption made the same as that of the magenta filter. |
| Lower | Yellow | Absorbs blue. | Absorbs a little green and red. | Same green to red transmission ratio as the blue filter and same green and red transmissions as yellow filter. Orange. | Blue | Absorbs green and red. | Green to red transmission ratio made the same as that of the yellow filter. |
| Upper | Yellow | do | Absorbs a little green and red. Red absorption made the same as that of the magenta filter. | Absorbs the same amount of red as yellow and magenta filters. Colorless. | Magenta | Absorbs green. | Absorbs some blue and a little red. |
| Lower | Cyan | Absorbs red. | Absorbs some green and blue. | Same green to blue transmission ratio as the red filter and same green and blue absorptions as cyan filter. Pink. | Red | Absorbs green and blue. | Green to blue transmission ratio made the same as that of the cyan filter. |

The two rows of filters 14, 15 and 16, and 17, 18 and 19 are mounted for movement, for instance on runners 7 and 8 and 12 and 13, as two units across the path of the light beam from the light source so that as one filter in each row is introduced into the light beam another is withdrawn. To prevent interaction between the two rows of filters it is necessary as shown in FIG. 3, to cover the entrance to the light scrambling device with a parallelogram shaped aperture 20 whose corners join the center of the sides of the light scrambling device and so join the separate filters in each row that the joins in one row are parallel to one pairs of sides of the parallelogram and the joins in the other row are parallel to the other pair of sides of the parallelogram. In one alternative to the parallelogram shaped aperture, the light scrambling device itself may have a cross-section contiguous with the parallelogram, so as to achieve the same effect with less loss of light. Other alternative arrangements of the two rows of filters which may be used to prevent interaction between the filtering actions of the two rows of filters due to their location, without prejudice to the operation of the method of the invention, are shown in FIGS. 4 and 5.

In these figures the same parts have the same reference numerals as in FIG. 1. The rows of filters are joined in the same manner as the filters 9, 10 and 11 of FIG. 2.

Figure 4:
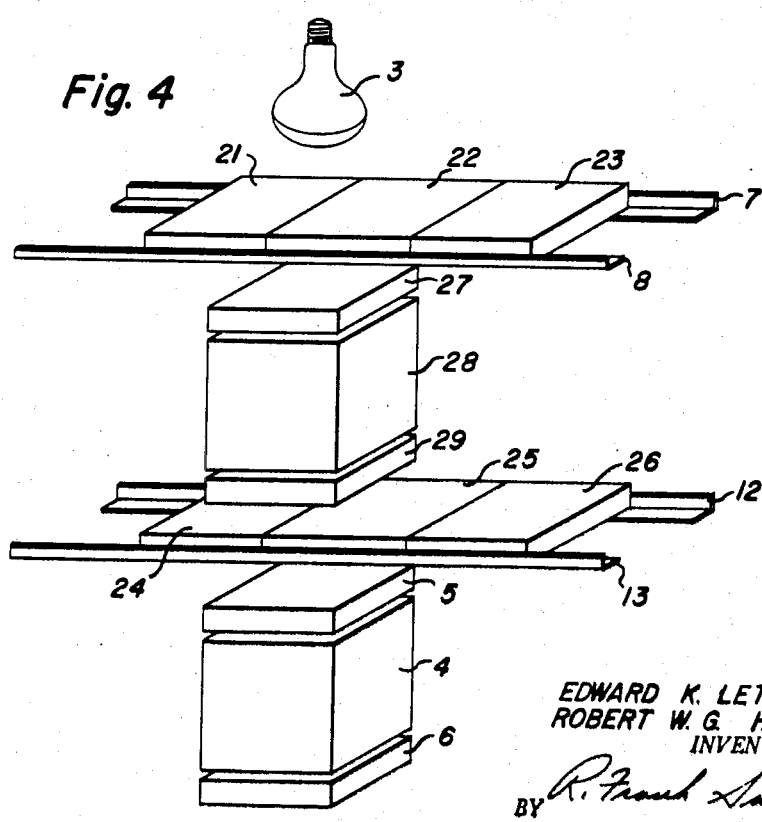
FIG. 4 shows diagrammatically two pairs of triple filters with an intermediate light scrambling device for carrying into effect the method of the invention.

In FIG. 4 a light scrambling device, which is shown to consist of a mirror box 28 and two diffusers 27 and 29 as previously described, are interposed between the two rows of filters 21, 22 and 23, and 24, 25 and 26, thus preventing interaction between their filtering actions due to their positioning. The said mirror box and diffusers may be replaced with any other known light scrambling device as previously described.

Figure 5:
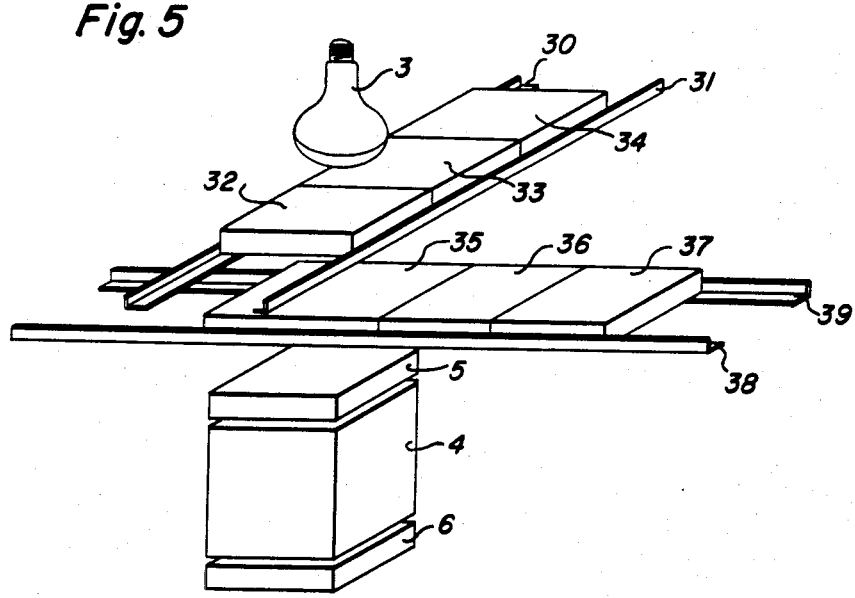
FIG. 5 shows diagrammatically two pairs of triple filters moving at right angles for carrying into effect the method of the invention.

In FIG. 5 two rows of filters 32, 33 and 34, and 35, 36 and 37 are mounted for movement, for instance on runners 38 and 39 and 30 and 31, as two units across the path of the light beam from the light source so that one filter row, 35, 36 and 37 has a direction of movement which is at an angle to that of the other filter row 32, 33 and 34, all the joins between the filters, and the sides of the entrance to the light scrambling device, being parallel to one direction of movement or the other as shown in FIG. 5, thus preventing interaction between their filtering actions due to their positioning.

Assuming that the colored filters 17 and 19 of FIG. 3 are green and magenta respectively and the correcting filter 18 is chosen according to the method of the invention described above, the row of filters will function in precisely the manner described for filters 9, 10 and 11 of FIG. 2. If filters 14 and 16 are cyan and yellow respectively and are fully withdrawn from the light beam, the correcting filter 15 will have the same green absorption as the cyan and yellow filters and will be disposed fully in the light beam. As the cyan filter is introduced into the light beam, the correcting filter will be progressively withdrawn from the light beam so that in all positions of the filters the light beam will be intercepted by one or the other of the filters or by a part of both. Similarly as the yellow filter is introduced into the light beam the correcting filter will be progressively withdrawn from the light beam so that in all positions of the filters the light beam will be intercepted by one or the other of the filters or by a part of two but never the two color filters, unless the correcting filter is deliberately made narrower than the aperture of the light scrambling device in order to minimize variations in the rate of change of filtration and in the overall intensities. Because the correcting filter has the same transmission in the green region as the cyan and yellow filters, adjustment of the position of the filters so that the cyan filter enters the beam does not alter the amount of green light in the issuing beam, and adjustment of the filters so that the yellow filter enters the beam does not alter the amount of green light in the issuing beam. Hence, these three filters 14, 15 and 16 thus provide a means for adjusting the red to green or blue, or the blue to green or red ratio of the beam without altering the intensity in the green region of the spectrum.

It is obvious that other sets of filters chosen according to the table would give analogous results.

The complete system of filters constructed according to the previous description thus provides a method of altering the spectral composition of an illuminant, consisting of a light source and light scrambling device, in any direction, that is, considering the spectral composition of the illuminant when only the two correcting filters are in position, the illuminant may be made more red, less red, more green, less green, more blue or less blue by the appropriate manipulation of only two controls which alter the positions of the two filter rows.

The method according to the invention is particularly applicable to making enlargements from color negatives in an enlarger of known type in which a color negative is illuminated by a light source and an image of the negative is focused on a sheet of photographic paper which can be developed to give a colored image, such as Ektacolor Paper. With a gas-filled tungsten filament light source the following is an example of the filters which may be employed in carrying out the method according to the invention:

Kodak Color Correction Filter Nos.
Upper layer: cc. 50 cyan; cc. 10 magenta; cc. 50 yellow+ cc. 10 magenta
Lower layer: cc. 50 magenta; cc. 10 yellow; cc. 50 green+ cc. 10 yellow The invention has been described in detail with particular reference to preferred embodiments thereof, but it will be understood that variations and modifications may be effected within the spirit and scope of the invention as described hereinabove and as defined in the appended claims.

Having thus described our invention, what we claim as new and desire to secure by Letters Patent of the United States is:

1. The method of varying the spectral composition of a beam of light containing colors in at least three regions of the spectrum which comprises adjustably inserting into said light beam a color control filter which has greater transmission in at least one of said regions of the spectrum and lesser transmissions in said other regions of the spectrum in a given ratio to each other, and keeping substantially constant the ratio of the transmitted light intensities in the regions of said lesser transmissions as said color control filter is inserted into said beam by varying amounts, including fully in and completely out of said beam, by maintaining in the part of said light beam not intercepted by the color control filter a correcting light filter having greater transmissions but substantially the same transmission ratio in said regions of lesser transmission as said color control filter.

2. The method of varying the spectral composition of a beam of light containing colors in three regions of the spectrum which comprises adjustably inserting into said light beam a color control filter which has a greater transmission in one of said regions of the spectrum and lesser transmissions in the other two said regions of the spectrum in a given ratio to each other, and keeping substantially constant the ratio of the transmitted light intensities in the said two regions of lesser transmission as said color filter is inserted into said beam by varying amounts, including fully in and completely out of said beam, by maintaining in the part of said light beam not intercepted by the color control filter a correcting light filter having greater transmissions but substantially the same transmission ratio in said other two regions of lesser transmission as said color control filter.

3. The method of varying the spectral composition of a beam of light containing colors in three regions of the spectrum which comprises adjustably inserting a row of three adjacent filters into and out of said beam in succession so that any one or parts of any two adjacent filters are disposed in said beam at a given time, the first filter of said row consisting of a color control filter having a greater transmission in one region of the spectrum and lesser transmission in each of the other two regions of the spectrum in a given ratio to each other, the third filter of said row consisting of a color control filter having a minimum transmission in said one region of the spectrum and substantially the same transmission ratio as said first filter in the other two regions of the spectrum and the second filter of said row consisting of a correcting filter located between the first and third filters and having substantially the same transmission ratio as said first filter in said two regions of the spectrum but greater transmissions than said first filter in said other two regions of the spectrum so as to counteract the effects of both the differences in the lesser transmissions of said first filter and the unwanted absorptions of the third filter in said other two regions of the spectrum on the ratio of the intensities of said other two regions of the spectrum to each other.

4. The method of varying the spectral composition of a beam of light containing colors in three regions of the spectrum which comprises adjustably inserting into said beam two rows of three adjacent filters, one row of filters located above the other and said rows of filters being arranged in such a manner that there is no interaction on their filtering actions due to their positioning relative to each other, said two rows of filters each consisting of two color control filters and a correcting filter located between them and arranged for movement between two extreme positions in which the light beam is intercepted by a different one of said color control filters, a central position in which the light beam is intercepted solely by said correcting filters, and intermediate positions in which the light beam is intercepted by varying amounts of said correcting filters and one color control filter, the filters of one row consisting of two color control filters each absorbing a different region of the spectrum and the correcting filter therebetween having the same absorption as each of said color filters in the third region of the spectrum so as to counteract the effect of the color control filters on the intensity of said third region of the spectrum, and the filters of the other row consisting of two color control filters, one absorbing the region of the spectrum not greatly absorbed by said color control filters of said first row, the other color filter absorbing in the other two regions of the spectrum and the correcting filter transmitting in the same said two regions in the same ratio as said color filter which greatly absorbs them so as to counteract the effect of the transmission differences in said filter and absorbing the said two regions by the same amount as the color filter of the second row which does not greatly absorb them so as to counteract the effect of the unwanted absorption of said filter whereby appropriate movement of one or both of the two rows of filters enables the ratio of the intensities of any two regions of the spectrum to be varied without affecting the ratios of the intensities of the other regions of the spectrum.

5. The method of varying the spectral composition of a beam of light according to claim 4 where the interaction on the filtering actions of the two rows of filters is obviated by locating their directions of movement at an angle to each other.

6. The method of varying the spectral composition of a beam of light according to claim 4 in which the two rows of filters have parallel directions of movement and interaction on their filtering action is obviated by providing said light scrambling device with an entrance which is a parallelogram, one diagonal of which is parallel to said direction of movement, the filters of each row being so cut that their joins are parallel to one side of said parallelogram on one row and the other side of said parallelogram in the other row.

7. The method of varying the spectral composition of a beam of light according to claim 4 in which the two rows of filterss have parallel directions of movement and interaction on their filtering actions is obviated by interposing therebetween a light scrambling device.

References Cited by the Examiner
UNITED STATES PATENTS

| | | | |
|---|---|---|---|
| 1,830,637 | 11/1931 | Brosse | 88—111 |
| 2,213,382 | 9/1940 | Busse | 88—111 X |
| 2,272,646 | 2/1942 | Schmidt et al. | |
| 3,083,614 | 4/1963 | Veit | 88—108 X |

FOREIGN PATENTS

| | | |
|---|---|---|
| 1,066,515 | 1/1954 | France. |
| 1,228,775 | 3/1960 | France. |

DAVID H. RUBIN, *Primary Examiner.*

EMIL G. ANDERSON, *Examiner.*